(12) United States Patent
Gächter Toya et al.

(10) Patent No.: US 11,015,932 B2
(45) Date of Patent: *May 25, 2021

(54) SURVEYING INSTRUMENT FOR SCANNING AN OBJECT AND IMAGE ACQUISITION OF THE OBJECT

(71) Applicant: HEXAGON TECHNOLOGY CENTER GMBH, Heerbrugg (CH)

(72) Inventors: Stefan Martin Benjamin Gächter Toya, St.Gallen (CH); Thomas Jensen, Rorschach (CH); Andreas Schwendener, Chur (CH); Tim Mayer, Horn (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 562 days.

This patent is subject to a terminal disclaimer.

(21) Appl. No.: 15/904,096

(22) Filed: Feb. 23, 2018

(65) Prior Publication Data

US 2018/0238687 A1    Aug. 23, 2018

(30) Foreign Application Priority Data

Feb. 23, 2017    (EP) ..................................... 17157648

(51) Int. Cl.
*G01C 3/08* (2006.01)
*G01C 15/00* (2006.01)
(Continued)

(52) U.S. Cl.
CPC ............. *G01C 15/002* (2013.01); *G01C 1/04* (2013.01); *G01S 7/4812* (2013.01);
(Continued)

(58) Field of Classification Search
CPC ...... G01S 7/4817; G01S 7/4812; G01S 17/42; G01S 17/86; G01S 17/89; G01C 1/04; G01C 15/002
(Continued)

(56) References Cited

U.S. PATENT DOCUMENTS 7,127,822 B2 * 10/2006 Kumagai ............. G01C 15/002
33/290
2010/0134596 A1    6/2010 Becker
(Continued)

FOREIGN PATENT DOCUMENTS

EP    2 718 669 A1    4/2014

OTHER PUBLICATIONS

Extended European search report dated Aug. 1, 2017 as received in Application No. 17157648.1.

*Primary Examiner* — Mark Hellner
(74) *Attorney, Agent, or Firm* — Maschoff Brennan

(57) ABSTRACT

A surveying device including a base defining a base axis, a support structure rotatable around the base axis and defining a rotation axis, a light emitting unit emitting light and a light receiving unit for detecting reflected light. A rotation unit is mounted on the support structure for emitting and receiving light in defined directions, wherein the rotation unit comprises a rotation body rotatable around the rotation axis including a scanning mirror arranged tilted relative to the rotation axis. An imaging unit for capturing an image of a scanning region is provided. The imaging unit comprises a camera fixedly arranged on the support structure, the rotation body comprises at least one reflecting deflecting surface assigned to the camera. The imaging unit and the rotation body are arranged so that the field of view comprises a defined field angle around the rotation axis.

14 Claims, 3 Drawing Sheets

(51) Int. Cl.
  *G01S 17/89* (2020.01)
  *G01S 17/42* (2006.01)
  *G01C 1/04* (2006.01)
  *G01S 7/481* (2006.01)
  *G01S 17/86* (2020.01)
(52) U.S. Cl.
  CPC ............ *G01S 7/4817* (2013.01); *G01S 17/42* (2013.01); *G01S 17/86* (2020.01); *G01S 17/89* (2013.01)
(58) Field of Classification Search
  USPC ........................................................ 356/4.01
  See application file for complete search history.

(56) References Cited

U.S. PATENT DOCUMENTS

| | | |
|---|---|---|
| 2012/0070077 A1 | 3/2012 | Ossig et al. |
| 2012/0249997 A1 | 10/2012 | Matsumoto et al. |
| 2012/0287265 A1 | 11/2012 | Schumann et al. |
| 2014/0063489 A1 | 3/2014 | Steffey et al. |
| 2015/0043009 A1 | 2/2015 | Bridges et al. |
| 2016/0061954 A1 | 3/2016 | Walsh et al. |

\* cited by examiner

SURVEYING INSTRUMENT FOR SCANNING AN OBJECT AND IMAGE ACQUISITION OF THE OBJECT

CROSS-REFERENCE TO RELATED APPLICATIONS

This application claims priority to European Patent Application No. 17157648 filed on Feb. 23, 2017. The foregoing patent application are incorporated herein by reference.

FIELD OF INVENTION

The present invention relates to a surveying device.

BACKGROUND

Laser scanning is used to survey many different settings such as construction sites, building facades, industrial facilities, interior of houses, or any other applicable setting. The laser scans achieved therewith may be used to obtain accurate three-dimensional (3D) models of a setting, wherein the models consist of a point cloud. The points of such a cloud are stored by coordinates in a coordinate system, which may be defined by the laser scanning device that had recorded the point cloud. Usually, the laser scanner constitutes the origin of the coordinate system by a unit that sends out the scanning beams, in particular by the nodal point of the scanner. The points are surveyed by associating a distance measured with the scanning beam (for example, with a time-of-flight method) and the alignment under which the distance was measured. Usually, the coordinate system is a spherical coordinate system, so that a point can be characterized by a distance value, an elevation angle and an azimuth angle with reference to the origin of the coordinate system.

Common laser scanners comprise a unit for sending out a scanning beam and for receiving the reflected beam in order to measure the distance of a point the beam was directed at. Usually, these scanners furthermore comprise means to rotatably alter the direction of the beams, commonly a vertical rotation axis (scanning axis) and a horizontal rotation axis (base axis), of which one may be a slow axis and the other one may be a fast axis, wherein both axes can be sensed with angle sensors. The rotation of the vertical axis is associated with an azimuth angle and the rotation of the horizontal axis is associated with by an elevation angle.

The distances may be calculated with the travel time measurement (time-of-flight) method by observing the time between sending out and receiving a signal. Other possible method could be to measure the phase delay between sent and received signal. The alignment angles can be achieved with said angle sensors arranged at the vertical axis and at the horizontal axis. Other possible method could be to derive the angles from the known constant rotation speed of the axes, a point of reference, and the sampling rate of the distance measurements.

Another means to document the environment is to acquire a panorama or full-dome image of the settings. Such an image can provide a more intuitive visualization than a point cloud or a different visualization of the environment when the image sensors capture a different spectrum than the visible one, e.g. with thermal cameras. In general, such a panorama or full-dome image is used to digitally colourise the point cloud for a more ergonomic visualization. In various applications, terrestrial laser scanning is hence supported by imaging data of a camera which is combined with a laser scanner by including them in the laser scanner instrument or mounting them on the same platform as the laser scanner.

Such is known in prior art and for example described in US20140063489A1, US2016061954A1 and US20120070077A1.

However, prior art typically offers comparatively complicated solutions to solve parallax errors which occur due to different perspectives of a camera and a scanner. For example, according to US20140063489A1, the camera is incorporated inside the scanner and components are arranged such that the camera and the scanner have the same optical axis. However the entrance pupil location of the camera is not at the same location as the nodal point. Therefore only the central point of the camera has the same perspective as the scanner. Other points in the field of view of the camera will have a parallax error. This construction requires a high technical effort.

According to US20120070077A1, a camera is a posteriori brought virtually into a position close to the position where the scanner had been to scan the environment. This process requires high processing effort with limited success. Artefacts will remain due to the relatively large parallax between entrance pupil of camera and nodal point of scanner.

If a camera on a laser scanner does not share a single projective centre with the scanner unit, then a parallax is introduced. As a consequence an incorrect reference of image data to scanning data may happen. The parallax effect takes place at regions where the camera "looks" under a significantly different angle than the scanner to a certain object point and therefore "sees" this point at a different 3D-position, than the scanner "sees" it. Additionally, there can be points, "seen" by the scanner, but not by the camera, which results in 3D-points without colour data. In order to avoid such incorrect reference of colourisation or missing of colour data due to the camera's parallax, an algorithm for identifying these particular regions can be implemented including the use of 3D data and for correcting colourisation. Such algorithmic approach, however, is comparatively time-consuming and resource (energy) consuming and still cannot fully correct colourisation, especially in the near field. Therefore artefacts will occur in the colorized 3D point cloud data.

BRIEF DESCRIPTION OF THE INVENTION

It is therefore an object of the present invention to provide an improved laser scanner allowing for a provision of image acquisition with high precision, exact reference to gathered scanning data and in particular with no missing colour data.

The present invention is based on the idea to provide a less complex and comparatively low cost solution of basically parallax-free image acquisition with a laser scanner. One main element of such solution is a particular design of the rotator of a laser scanner. Such rotation unit and its rotation body are equipped with one or a plurality of deflecting surfaces (in addition to a scanning mirror which is also provided with the rotation body). A camera device, which is assigned to the deflecting surface is arranged at a support structure of the scanner and thus is fixed relative to the rotation body.

These two components—the rotation body and the camera—are arranged and designed so that the viewing axis and therefore the field of view of the camera is deflected and defined by the deflecting surface (reflecting imaging surface) in defined manner to provide image acquisition as if the entrance pupil of the camera is identical with the nodal point of the laser scanner. Such deflection can be provided in one particular alignment (orientation) of the rotation body around the scanning axis. This means, the rotation body is controlled to be orientated into such defined alignment and image acquisition can be performed by rotating or swivelling the support structure around the base axis while keeping the rotation angle for the rotation body constant. By that, a panoramic image or—depending on an elevation field angle of the resulting field of view—a full dome image can be acquired.

In other words and more general, the invention relates to a surveying device which in particular is embodied as a geodetic surveying device, in particular as a laser scanner. The surveying device comprises a base which defines a base axis and a support structure which is arranged to be rotatable around the base axis and which defines a scanning axis which is oriented basically orthogonal relative to the base axis. Furthermore, a light emitting unit for emitting measuring light, in particular a laser diode, and a light receiving unit comprising a (photosensitive) detector for detecting reflected measuring light are provided.

The surveying device also comprises a rotation unit mounted on the support structure for providing emission and reception of measuring light in defined and variable (due to rotations) directions, wherein the rotation unit comprises a rotation body which is mounted rotatable around the scanning axis and the rotation body comprises at least one slanted scanning surface which comprises a scanning mirror which is arranged tilted relative to the scanning axis and provides defined deflection of the measuring light. An imaging unit for capturing an image of a scanning region and a controlling and processing unit are arranged as well.

According to one embodiment of the invention, the imaging unit comprises at least one camera which is fixedly arranged on the support structure, wherein the camera defines a particular optical axis and the rotation body comprises at least one deflecting surface (reflecting surface) different from the scanning surface.

The at least one camera is assigned to the at least one deflecting surface so that at least one pair of camera and deflecting surface is provided. The imaging unit and the rotation body are designed so and arranged relative to each other so that only in a predetermined range of alignment of the rotation body around the rotation axis—
the optical axis of the at least one camera is deflected by its assigned deflecting surface and
a field of view of the at least one camera is deflected and defined by the respectively assigned deflecting surface (i.e. by its deflection) so that the field of view comprises a defined field angle (e.g. a comparatively large field angle) in a plane at least basically orthogonal to or inclined (e.g. by 15°, 30° or 45°) in defined manner relative to the rotation axis of the rotation body.

A comparatively large field angle in the plane at least basically orthogonal to the rotation axis of the rotation body would relate in particular to a significant smaller field angle in a plane parallel to the rotation axis of the surveying instrument. Hence, there may be provided a field of view with a larger elevation field angle and a smaller azimuth field angle.

Therefore, the surveying instrument according to the embodiment of the invention enables to bring and hold the rotation body in a well defined and known orientation, e.g. so that the rotation body provides a defined rotation angle around the rotation (scanning) axis, and by that enabling the camera to see at least part of the scanning region (in particular referring to the azimuth scanning direction) which can be measured by means of scanning with the measuring light. A particular arrangement of camera and deflecting surface and a particular design of the rotation body can also provide that respective images are captured as if the entrance pupil of the camera is located in or near the nodal point of the surveying instrument and thus results in parallax-free or quasi-parallax-free image capturing (see below).

According to another embodiment of the invention, the imaging unit comprises at least two cameras which are fixedly arranged on the scanner frame, each camera defining a particular optical axis, and the rotation body comprises at least two adjacent deflecting surfaces. The at least two deflecting surfaces are arranged tilted relative to each other, in particular so that each of the deflecting surfaces lies on a different lateral face of a virtual polygonal pyramid defined by the orientations of the deflecting surfaces. Moreover, each of the at least two cameras is assigned to one particular of the at least two deflecting surfaces so that at least two pairs of one of the cameras and one of the deflecting surfaces are provided. In other words, each camera is assigned to exactly one of the deflecting surfaces, wherein—the other way round—each deflecting surface is assigned to exactly one camera. Each camera-surface-pair has its particular camera and deflecting surface. In addition, the imaging unit and the rotation body are designed so and arranged relative to each other so that in the predetermined range of alignment of the rotation body around the rotation axis a combined and continued wide-angle field of view around the rotation axis or with reference to the plane at least basically orthogonal to or inclined in defined manner relative to the rotation axis, in particular with reference to an angle of rotation of the rotation body, in particular with reference to an elevation angle, is provided (by respective deflections by the deflecting surfaces).

The pairs of cameras and deflecting surfaces produce one extended field of view which is composed by individual sub-fields of view which are provided by each particular camera-surface-pair. The cameras and the deflecting surfaces are preferably designed so that the individual fields of view overlap to some extent regarding the elevation angle. Thus, there is one continued field angle of image acquisition with an angular limitation given by the two sub-fields of view.

For instance, by use of such arrangement of two cameras a full-dome image of a setting can be acquired.

Of course, image processing of the image data gathered by means of the at least two cameras can be provided in a manner so that there results one set of image data comprising data from both cameras. E.g. matching, blending and composition (e.g. stitching) of image data is performed according to approaches well known in the art. Based on such unified image data e.g. colouring of a scanning point cloud is provided in improved manner.

According to a particular embodiment of the invention, the imaging unit comprises three or more cameras and the rotation body comprises three or more deflecting surfaces, wherein each camera is assigned to one of the deflecting surfaces so that three or more respective camera-surface-pairs are provided, each pair comprising one of the cameras and one of the deflecting surfaces (in the predetermined range or state of alignment). A combined and continued wide-angle field of view with reference to a rotation angle around the rotation axis, e.g. in the plane basically orthogonal or inclined in defined manner relative to the rotation axis, is provided by these three or more pairs.

By use of three pairs of camera and deflecting surface the field of view which can be covered is extendable so that the field of view in elevation direction covers up to half of the solid angle and thus provides to generate a full-dome image of the scanning region by swivelling or rotating the support structure around the (vertical) base axis one time by 360° while acquiring image data. The provided elevation angle of the total field of view may be designed so that a base region of the field of view, i.e. an angular range which would provide gathering image data of the base of the surveying instrument, is excluded.

The total field of view thus can be smaller than half of the solid angle, i.e. <180°, wherein a suitable full dome image can be derived.

In particular, the (continued wide-angle) field of view covers an angle of at least 100°, in particular 120° or 150°, around the rotation axis (elevation angle). This would provide to still include a vertical up angle basically corresponding to a direction of the base axis, wherein a region in down direction which would be hidden by the structure of the surveying device (also for scanning measurements) anyway is not covered by the wide-angle field of view.

In one embodiment the rotation body may comprise one deflecting surface and the imaging unit comprises two or more cameras. Here, the rotation body may be brought in at least two defined rotation positions within the predetermined rotation alignment so that in a first such position an optical axis of the first and in second such position an optical axis of the second camera is deflected. An enlarged field of view (being composed by the individual fields of view) can be provided by successive image acquisition with respect to particular rotations of the rotation body.

The at least two deflecting surfaces or the three deflecting surfaces can be arranged with defined distance, in particular gap, between two successively arranged adjacent deflecting surfaces. Alternatively, the surfaces can be designed so that there is no gap in-between.

In case that there is no gap between two adjacent and successively arranges deflecting surfaces in theory a totally parallax-free design can be provided. However, a difference between the device's nodal point and the intersection points (projection centres) of the particular fields of view may occur. Moreover, the camera which defines a first field of view may see the marginal rays of second field of view of and reverse.

In an alternative, if a defined gap is provided between two adjacent deflecting surfaces, there can be a clear separation of the particular fields of view. A small parallax may be provided by adapting a distance between the respective camera entrance pupils and the mirrors. The gap can be kept comparatively small in order to still provide a quasi-parallax-free design, wherein the minor parallax can be neglected in the course of gathering image data and further processing of such data.

According to an embodiment of the invention each of the fields of view which is defined by a deflection by means of the assigned deflecting surface—in the predetermined alignment range—partly covers the combined wide-angle field of view, wherein an overlap of adjacent fields of view is provided, in particular wherein an overlapping region of the adjacent fields of view is defined by the field angles of the adjacent fields of view.

In a further embodiment, the imaging unit comprises at least two sets of cameras, wherein each set comprises an identical number of at least one camera, the rotation body comprises a defined number of deflecting surfaces corresponding to the identical number of cameras, and the predetermined range of alignment of the rotation body around the rotation axis comprises a number of at least two defined imaging alignments, the number corresponding to the number of sets of cameras. Each deflecting surface here is assigned to one camera of each set of cameras, i.e. each deflecting surface is assigned to more than one camera. The imaging unit and the rotation body are designed so and arranged relative to each other so that in a first of the at least two defined imaging alignments the optical axis of the one camera of the first set of cameras is deflected by the assigned deflecting surface and a field of view of the one camera of the first set of cameras is deflected and defined by the assigned deflecting surface so that the field of view comprises a comparatively large field angle with reference to a rotation angle around the rotation axis, e.g. in a plane which is basically orthogonal to the rotation axis. Moreover, the imaging unit and the rotation body are designed so and arranged relative to each other so that in a second of the at least two defined imaging alignments the optical axis of the one camera of the second set of cameras is deflected by the assigned deflecting surface and field of view of the one camera of the second set of cameras is deflected and defined by the assigned deflecting surface so that the field of view comprises a comparatively large field angle with reference to a rotation angle around the rotation axis, e.g. in a plane which is basically orthogonal to the rotation axis.

In particular, the cameras of the first set are provided as visual cameras and the cameras of the second set are provided as infrared cameras.

The above embodiment provides acquisition of a first full-dome or panoramic image with the rotor in a first position with e.g. RGB imagers, and of a second full-dome or panoramic image in a second rotor position with e.g. NIR imagers for thermal inspections.

In general, the cameras of the first set and the cameras of the second set have different characteristics according to the task to be solved or data to be gathered. The first set could be high-resolution, rolling shutter cameras to record a panorama image the second set could be lower resolution, global shutter cameras for navigation (e.g. for SLAM).

Furthermore, each camera within the set could have different characteristics as well, e.g. nodal camera could have lower resolution than other cameras, because it is covering a smaller part.

The full-dome image can preferably be acquired with an embodiment with which each of the camera set comprises two or three cameras and the rotor comprises two or three respective deflecting surfaces (as described above and shown with figures below).

In one embodiment, the controlling and processing unit provides an imaging functionality which is configured so that image data is captured with each of the at least one cameras in case the rotation body is in the predetermined range of alignment. More particular, the imaging functionality can be configured so that image data is acquired while rotating the rotation body.

The controlling and processing unit can be configured to control a step of rotating the rotation body around the rotation axis so that the rotation body is brought (and hold) in the predetermined range of alignment. Such controlled rotation may be initiated as a pre-step for acquiring image data for a scanned object or region.

According to an embodiment of the invention the imaging unit and the rotation body are designed so and arranged relative to each other so that in the predetermined range or state of alignment of the rotation body, e.g. in a defined angular orientation of the rotation body, optical distances from each of the deflecting surfaces to respective entrance pupils of the respectively assigned cameras are basically equal. Such design can provide particular equal centres of projection for the captured image data.

Furthermore, the imaging unit and the rotation body can be designed so and arranged relative to each other so that in the predetermined range of alignment of the rotation body an optical distance from at least one of the deflecting surfaces to a respective entrance pupil of the respectively assigned camera along the optical axis of this camera basically corresponds to an optical distance from an intersection point of the optical axis with the deflecting surfaces to a nodal point of the surveying device, in particular wherein the nodal point is a point of intersection of the rotation axis of the rotation body (fast scan axis) and the vertical axis of the instrument (slow scan axis). That specific design provides that the cameras are placed like their entrance pupils or centres of projection are (basically) identical with the nodal point of the surveying device.

The entrance pupils or centres of projection of the camera are thus positioned virtually in the nodal point of the system. In other words, the entrance pupils of all fields of view (defined by the cameras and respective deflecting surfaces) coincide with the intersection point of a horizontal and vertical axis of the surveying device (nodal point). By that, a parallax free full-dome image can be captured.

As a result the imaging setup acts as one particular camera which has virtually a single projective centre. This centre virtually coincides with the nodal point of the surveying device that may be embodied as a laser scanner. The field-of-view is somehow optimised in order to minimise acquisition time for a full-dome image.

Referring to particular embodiments of the deflecting surfaces at least one of the deflecting surfaces can be provided by a reflecting mirror, wherein the reflecting mirror is provided by one planar surface of the rotation body, wherein the planar surface is formed, in particular milled and/or polished, as one part with the rotation body. Hence, the mirrors can be milled or turned into a monolithic rotor (rotation body). To get the entrance pupil of the cameras inside the frame (support structure) of a scanner the mirrors need a large distance from the intersection point of the axis (nodal point) due to the provision of having no parallax. Therefore the rotor gets bigger as known from prior art.

Alternatively, the reflecting mirror is provided as a separate mirror element attached, in particular glued, to the rotation body.

According to an embodiment of realising at least one of the deflecting surfaces, at least one of the deflecting surfaces is provided by a coated mirror surface of a prismatic element, wherein the prismatic element is attached to the rotation body. In particular, the prismatic element is embodied as a prism, in particular a polygonal prism. Preferably, the prismatic element is composed by at least two optical portions, wherein each of which provides particular optical properties. The optical portions can be represented by respective glass bodies with defined refractive indices. The optical portions (prism elements) may be of different densities or of a combination of appropriate air-gap and solid optic element.

The prismatic element may be attached by gluing or clamping onto/to the rotation body.

In particular, the prismatic element is formed out of material having a density basically corresponding to a density of the material the rotation body is formed out of. Alternatively or additionally, the prismatic element is formed out of material having a refractive index n significant greater than the refractive index n of air or vacuum, in particular wherein n>1.4.

Above properties provide easy integration or combination of the prismatic element with the rotation body. By having at least similar densities, weight distribution over the entire rotor is improved. A refractive index n>1.4 may provide artificial extension of the optical distance between the camera and the deflecting surface which leads to a much more compact design of the rotation body because the distance between the nodal point and the deflecting surface can be built shorter than the distance between the deflecting surface and the camera.

Furthermore, parts of the camera optics, in particular the front lens, can be integrated in the rotor to better adjust the location of the entrance pupil.

Preferably, the rotation body is designed so that a reflecting surface of the scanning mirror faces in opposite direction of at least one of the deflecting surfaces.

The rotation body can also be designed so that the scanning mirror is arranged on a front side of the rotation body and the deflecting surfaces are arranged on the backside of the rotation body.

According to an embodiment, the rotation body is arranged in a cylindrical cover which is designed to provide at least a first transmission window for emission and reception of the measuring light and a second transmission window for reception of light for capturing images by the at least one camera. Such cover can help holding the prismatic element in defined position relative to the rotation body and may additionally protect the optical elements and the cameras from environmental influences. Furthermore, surfaces of the glass prism can be easily cleaned in case of contamination. The outside angle between the prisms is uncritical regarding injury or safety aspects.

In context of the present invention, the predetermined state of alignment may be provided with only one particular rotation region around the rotation axis, in particular with only one particular rotation angle.

In particular the imaging unit can be used for navigation (SLAM), e.g. when carrying the laser scanner from a first to a second scan position. By that, improved referencing of respective scanning positions and coordinate systems can be provided.

Another embodiment of the invention relates to a rotation body of a rotation unit for a surveying device, in particular for a laser scanner, the rotation body being adapted to be mounted on the surveying device for providing defined emission and reception of measuring light by rotation around a rotation axis, the rotation axis being defined by a particular design, in particular by shape and dimension, of the rotation body, wherein the rotation body comprises at least one slanted scanning surface which comprises a scanning mirror which is arranged tilted relative to the rotation axis and provides defined deflection of the measuring light.

The rotation body comprises at least two deflecting surfaces each of which provides defined deflection of an optical axis of an assigned camera, the deflecting surfaces differ from the scanning surface. The at least two deflecting surfaces are arranged relative to each other so that each of the imaging surfaces lies on a different lateral face of a virtual polygonal pyramid defined thereby.

According to particular embodiments of the rotation body, the rotation body can be designed according to any particular embodiment described above in context of the surveying device. Such particular design is to be understood as not being limited to specific design of the body itself but has to be understood as including e.g. realisations of the deflecting surfaces or the like.

DESCRIPTION OF THE DRAWINGS

The devices according to the invention are described or explained in more detail below, purely by way of example, with reference to working examples shown schematically in the drawings. Specifically.

DETAILED DESCRIPTION

Figure 1A:
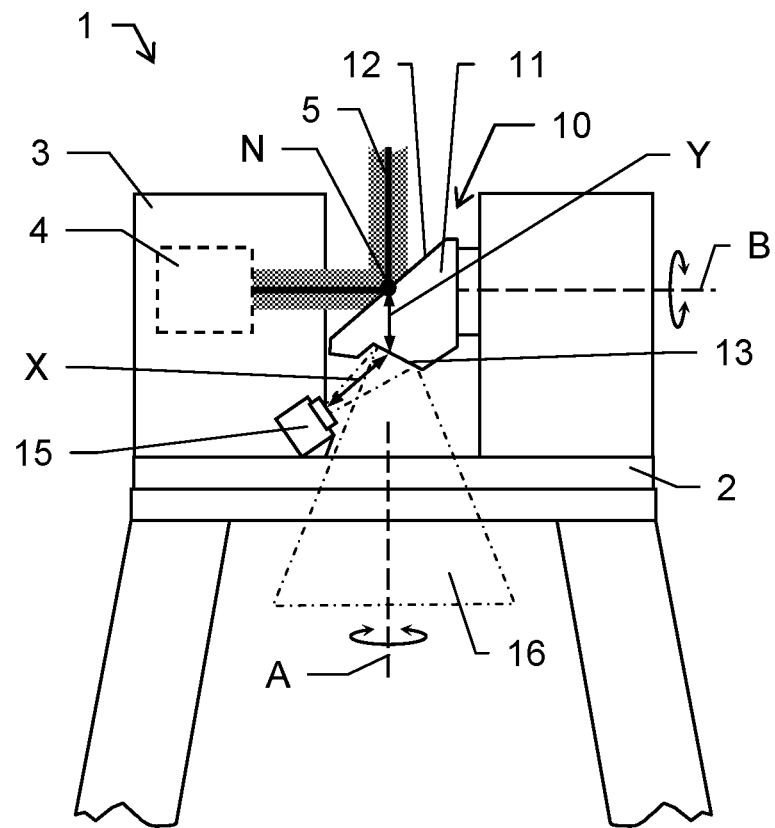
FIGS. 1a-c show a first embodiment of a surveying device embodied as a laser scanner according to the invention in different perspectives.

FIG. 1a shows a first embodiment of a laser scanner 1 according to the invention. The scanner 1 is shown here in a front-view perspective. The scanner 1 comprises a base 2 and a support unit 3 (scanner frame), wherein the base 2 defines a base axis A and the support unit 3 is arranged onto the base 2 and mounted rotatable around the base axis A. A rotational state of the support unit 3 relative to the base 2 is determinable by means of an angle encoder.

The support structure 3 defines and provides a scanning axis B which is aligned basically orthogonal to the base axis A. A rotation unit 10 is provided with the laser scanner 1 and arranged at the support structure 3 and mounted rotatable around the scanning axis B. The rotation unit 10 comprises a rotation body 11 with first scanning surface onto which a scanning mirror 12 is arranged tilted relative to the scanning axis B. In addition, the rotation body 11 or an axis by means of which the rotation body 11 is hold and rotated is coupled to an encoding unit which provides (continuous) determination of an angle of rotation of the rotation body 11 around the scanning axis B, i.e. relative to the support unit 3.

Furthermore, the scanner 1 comprises a distance measuring unit 4 which provides emission of measuring light 5 and detection of reflected measuring light 5 so that a distance to an object at which the measuring light is reflected can be determined. The distance measuring unit 4 preferably comprises a light emitting unit like a laser diode and a photosensitive detector for detecting backscattered light. Both, emitting measuring light and receiving measuring light are deflected by means of the scanning mirror 12 and guided to an object to be measured or to the distance measuring unit 4 respectively. It is to be understood that determination of such distances can be realised by several methods well known to one of ordinary skill in the art, e.g. distances may be determined by use of the time-of-flight principle.

As can be seen from the combination of the rotatable elements and the distance measuring unit 4, the laser scanner 1 is designed for scanning a scene or scanning region as the rotation body 11 for redirecting a measuring beam (which is sent to an object as a transmission beam and the reflection of which is received as reception beam by the distance measuring unit 4) is rotating around the horizontal scanning axis B, and as a body 3 of the laser scanner 1 is rotating around the vertical base axis A. By sending out and receiving measuring light (e.g. laser signals) at respective positions of the components rotating around said axes A and B, thereby applying EDM (electronic distance measurement) techniques known from prior art, such as travel time measurement, the laser scanner 1 is enabled to "sense" the surface of a scene or object and to store the scanned points characterised by their three-dimensional coordinates. The distances detected are assigned to angle coordinates which are provided by mentioned encoders (angle sensors) arranged around the vertical axis and the horizontal axis. During the scan, a three-dimensional point cloud can be generated, out of which a CAD (computer aided design) model may be created. Such CAD model may be regenerated with means of a surface recognition algorithm so that the CAD file is simplified by having unnecessary points reduced. Said CAD model generating may take place on a computer or process unit inside the laser scanner, or e.g. on an external computer or cloud computer by using the "raw data", i.e. the point cloud.

The laser scanner 1 further comprises an imaging unit for capturing image information related to a scanned object. According to the shown embodiment of the invention, the imaging unit comprises three camera sub-units (cameras), wherein only one camera 15 of those three cameras is exemplarily shown and described with FIG. 1a due to perspective issues. The description for that camera 15 can be transferred to all respective cameras arranged.

Correspondingly, the rotation body 11 comprises three deflecting surfaces, wherein only one deflecting surface 13 of those three deflecting surfaces is exemplarily shown and described with FIG. 1a due to perspective issues. The description for that deflecting surface 13 can be transferred to all arranged deflecting surfaces. The surface may be provided by a plane mirror at the rotation body 11.

The camera 15 is arranged fixedly with the support structure 3 and thus defines an optical axis with defined position and orientation relative to the scanner frame 3.

The cameras and the deflecting surfaces are designed so and arranges relative to each other so that—in a predetermined orientation of the rotation body 11 relative to the support structure 3 (as shown in FIG. 1a)—each of the cameras corresponds with one respective of the deflecting surfaces in desired manner. This means that the field of view of camera 15 (exemplarily) is deflected by its corresponding deflecting surface 13 and thus defined in a manner to provide a field of view 16 having a comparatively great field angle in rotation direction of the rotation body 11 (rotation around the rotation axis B; elevation angle) and a smaller field angle in azimuthal direction.

The same applies for the remaining two cameras and deflecting surfaces, wherein each of those two more camera-surface-pairs provides capturing of image information according to a comparatively large field angle in rotation direction of the rotation body.

The three cameras and the three deflecting surfaces are furthermore arranged so that the pairs of camera and deflecting surfaces define particular fields of view 16,17,18 which overlap to some extent in rotation direction of the rotation body, i.e. two adjacent fields of view both cover a particular and common angular region with reference to the elevation angle. Such design of the fields of view 16,17,18 can be seen in FIG. 1b which depicts the laser scanner 1 in a side view. FIG. 1c also shows covering of a wide-angle imaging region 19 by means of three overlapping fields of view 16,17,18, wherein the scanner 1 is shown in a perspective view.

As a result of such arrangement of cameras and deflecting surfaces, the elevation field angle of image covering 19 results to more than 150°. By rotating and holding the rotation body 11 in the predetermined orientation relative to the fixed cameras and swivelling the support structure 3 around the base axis A while continuously or stepwise taking pictures with the cameras, a quasi full dome image of a surrounding of the laser scanner 1 can be captured by one 360° rotation of the support structure 3 in a certain number of steps. The step size can be reduced until a continuous movement results. More particular, a panoramic image which at least covers those areas which are also accessible by the measuring light 5 of the laser scanner can be generated that way. This is a result of a (quasi) parallax-free arrangement of entrance pupils of the cameras with respect to the nodal point of the laser scanner 1.

According to the invention, the parallax-free arrangement is provided by the particular design of the scanner 1, i.e. by the relative arrangement of cameras and deflecting surfaces and shape and dimension of the rotation body 11. The camera 15 is arranged with a defined distance X to the deflecting surface, i.e. the distance X along the optical axis of the camera 15 from the entrance pupil of the camera 15 to the intersection point of the optical axis and the deflecting surface 13 is well known (at least in a predetermined alignment of the rotation body 11 as shown). Such distance X is chosen so that it basically corresponds to the distance Y from said intersection point to the nodal point N of the laser scanner 1. The nodal point N is defined by an intersection of the measuring light—or more particular of an optical axis defined by the measuring light—with the scanning mirror 12 (in particular, this point is coincident with the intersection of the A-Axis and the B-Axis). That provides capturing images with the camera 15 as if the centre of projection (entrance pupil of the camera) for image capturing is identical with the nodal point N for scanning.

A main advantage of such design is that image data is generated with a reference point which corresponds to the reference point of the scanning data. Therefore, data or coordinate transformations can be avoided or at least be reduced. A correction of parallaxes is also not required or at least greatly simplified because any significant imaging-scanning-parallax is initially avoided by the specific structural design of the system. Moreover, the camera is enabled to capture the same areas and points which can be measured by the scanner, i.e. there don't exist any occlusions of points, which could be scanned but could not be imaged.

According to an alternative embodiment of the laser scanner (not shown) the cameras and the deflecting surfaces are arranged so that there is a defined but small parallax provided in order to generate a small overlap between the fields of view of the cameras. To avoid, that a first camera "sees" not only via a first deflecting surface (mirror) to the object space but beyond its edges also via a part of a second mirror (pupil overlap), a defined "blocking" gap between two adjacent mirrors is provided. This arrangement can provide a respective parallax of e.g. 5 mm to provide a fields of view overlap, without introducing a pupil overlap at the deflecting surfaces. Such design with small parallax of e.g. 5 mm, is still considered as a "quasi parallax-free" system and provides basically the advantages mentioned above.

Figure 2:
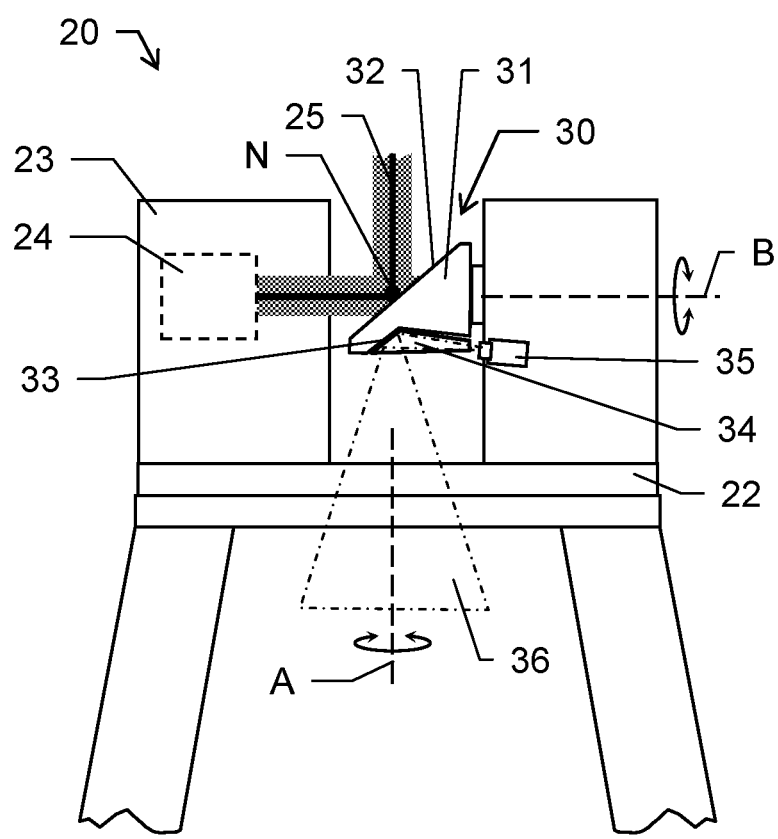
FIG. 2 shows a second embodiment of a surveying device embodied as a laser scanner according to the invention.

FIG. 2 shows a further embodiment of a laser scanner 20 according to the invention. The scanner 20 again comprises a base 22, a support structure 23 (scanner frame) and a rotation unit 30 with a rotation body 31. A laser emitting unit 24 having an electronic distance measurement device is arranged in the support structure 23 and provides emitting and receiving of a measuring laser beam 25.

Figure 1B:
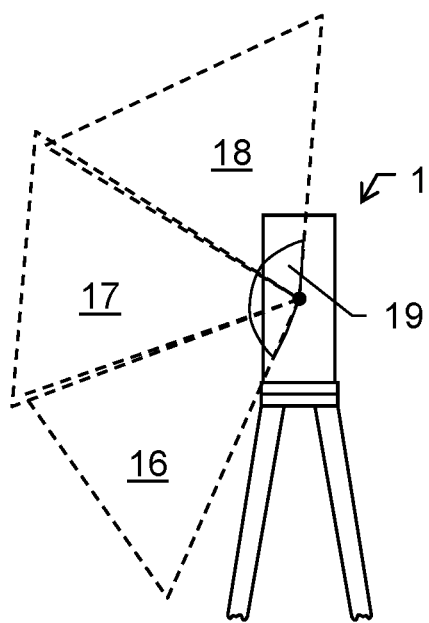
Figure 1C:
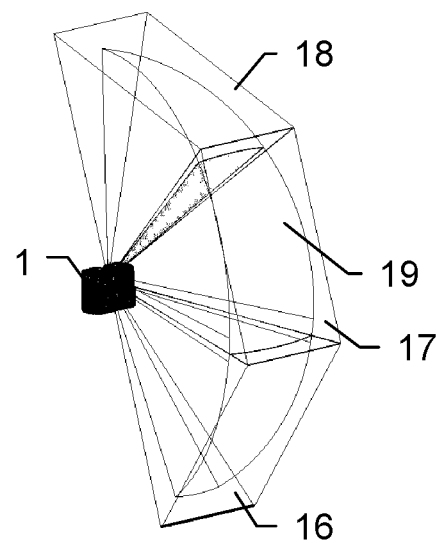

The main difference in contrast to the embodiment shown with FIG. 1a-c here is the design of the rotation body 11, of the deflecting surfaces 33 and of the arrangement of the camera 35.

The rotation unit 30 comprises a prism 34, e.g. made of glass or PMMA, wherein one of the surfaces 33 of the prism 34 is coated to provide a reflecting surface 33 which represents the deflecting surface of the rotation unit 30. In particular, the coating is made of highly reflecting material. The prism 34 provides a refracting index of n>1.4 which itself provides an extension of the optical distance. This allows designing the rotation body 31 smaller and of less weight as the distance from the nodal point N to the intersecting point of optical camera axis and coated mirror surface 33 can be chosen to be significantly smaller compared to the embodiment above, while simultaneously maintaining the distance between the intersecting point of optical camera axis with coated mirror surface 33 and the entrance pupil location of the lens.

As can be seen, the camera 35 here is fixedly arranged on the same side of the support structure 23 as the rotator is arranged at. Of course, depending on the design of the optical arrangement, the camera can alternatively be arranged on the opposite side.

Advantages of the shown embodiment are e.g. that the diameter of the rotor increase only marginal compared to rotors known from the art. The cameras 35 can be mounted into frame 23 with comparatively low effort, wherein connection of the camera remains quite simply. The camera lens can be hidden and protected by a rotor cover so that the camera is not directly visible from outside. By providing quite similar density of glass (prism) and aluminum (rotor) balancing of the rotor is simplified.

According to a preferred embodiment, the surface(s) between two prisms can be black painted to avoid an overlap of the pupil from one camera with the pupil of a second camera.

The prism 34 can be embodied as a single part. This means for providing three deflecting surfaces there are arranged three individual prism next to each other at the rotation body 31. In an alternative embodiment, there is built one prism component, wherein such component provides all of the three deflecting surfaces and the surfaces are arranged with defined orientation relative to each other. The deflecting surfaces are preferably arranged so that they lay on respective lateral faces of a virtual pyramid which is defined by the surfaces.

Figure 3:
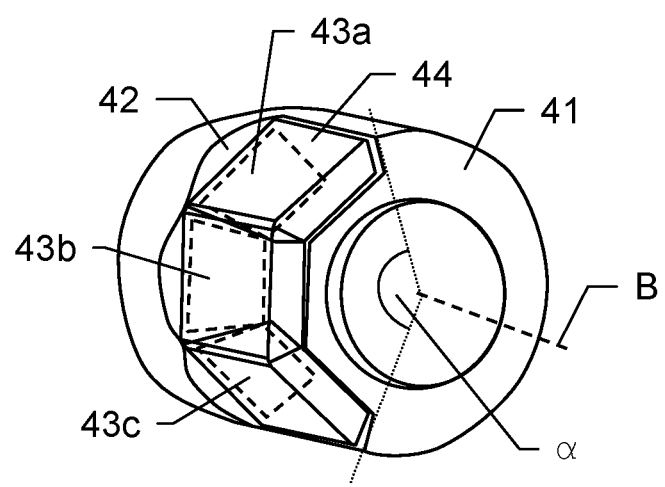
FIG. 3 shows an embodiment of a rotation body of a surveying device according to the invention.

FIG. 3 shows an embodiment of a rotation body 41 of a rotation unit for a laser scanner according to the invention. The rotation body 41 is shown from a backside perspective, i.e. a scanning mirror (not shown) is arranged on the opposite side of the body 41 (as exemplarily can be seen in the embodiment shown with FIG. 2). An axis of rotation B is defined by the shape and dimensions of the rotation body 41. The rotation body 41 further comprises a recess 42 which extends over a defined angular range α.

A deflecting component 44 is arranged in the recess 42 and is built in prismatic manner. In the shown embodiment the deflecting component 44 is built as a single part which comprises three segments which are arranged in defined orientation tilted relative to each other. Each segment comprises a reflecting mirror (deflecting) surface 43a,43b,43c. The mirror surfaces 43a,43b,43c are arranged tilted relative to the rotation axis B. In a preferred embodiment, the mirror surface normals 43a,43b,43c enclose identical angles with said axis B. Furthermore, the deflecting component 44 is designed so that the mirror surfaces 43a,43b,43c are arranged tilted relative to each other in defined manner. In particular, the mirror surfaces 43a,43b,43c are arranged so that they lay on different lateral faces of a polygonal pyramid which is defined by the surfaces 43a,43b,43c.

The mirror surfaces 43a,43b,43c are provided by a respectively coated surface of each segment of the component 44.

In an alternative embodiment, the deflecting component 44 comprises three prisms, wherein one surface of each of the prisms is provided as a deflecting surface. The prisms are arranged adjacent relative to each other. In particular, each prism is glued on the recess 42.

The deflecting surfaces 43a,43b,43c are preferably designed so that there is a defined gap between two successively arranged surfaces 43a,43b,43c.

In particular such surfaces of two adjacent prisms or segments which are facing each other are black painted in order to prevent light beams of being deflected to a non-assigned camera (no pupil overlap).

In such concept variant one sees three glass prism elements with a coated mirror, which can mirror the entrance pupil to the nodal point. With such glass prisms one can artificially increase the distance X (FIG. 1) by the larger refractive index of glass compared to air without increasing Y or introducing a larger parallax. The setup can be quasi-parallax-free.

Figure 4:
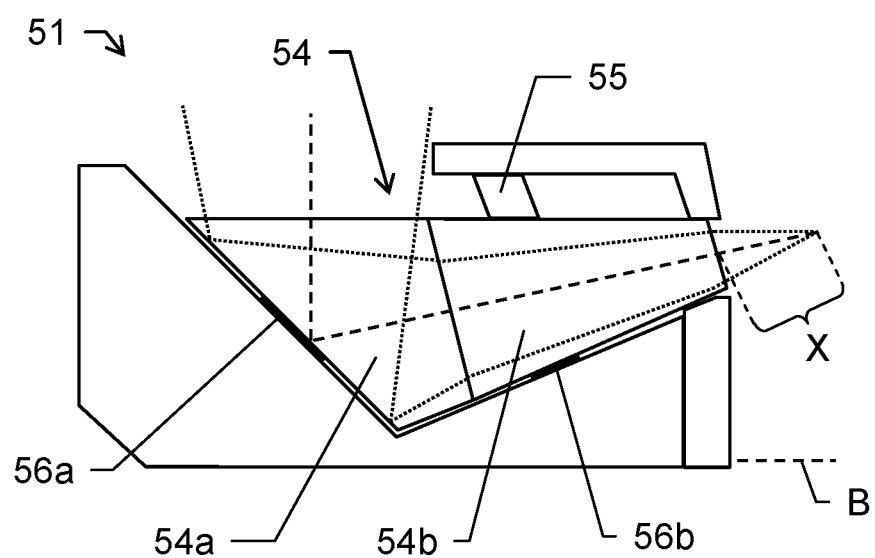
FIG. 4 shows a further embodiment of a rotation body of a surveying device according to the invention.

FIG. 4 shows an embodiment of a rotation body 51 (in part; crosscut) of a surveying device, wherein the rotation body 51 is designed to be rotated around the rotation axis B. The rotation body 51 comprises at least one deflecting member 54 in form of a prismatic element which comprises two optical portions 54a and 54b. The portions 54a, 54b are built with different optical properties, in particular with different refractive indices. In particular, the second portion 54b comprises a significant greater refractive index than the first portion 54a. The first optical portion 54a may comprise a refractive index of about 1.49 and the second optical portion 54b may comprise a refractive index of about 1.9. By having the second member 54b with a refractive index greater than the refractive index of the first member 54a an optical distance can be (artificially) extended as well. A more compact design of the rotation body becomes possible. By that, the distance X which represents a distance between the exit surface of the deflecting member 54 and an entrance pupil of a frame camera can be enlarged by a factor out of a region of 30% to 50% compared with a monolithic prism element having a refractive index of about 1.49.

The present embodiment also shows a fixation 55 for the deflecting member 54. It is to be understood that a two-part deflecting member 54 can also be arranged (e.g. glued) without such fixation 55 and—on the other hand—that alternative prism elements can be combined with such fixation. The fixation 55 for example comprises a spring which introduces a force in basically opposite direction to a centrifugal force which occurs on rotation of the rotation body 51. Such design provides to hold the deflecting member 54 in defined position at the rotation body.

There is also provided a three-point interface 56a,56b to carry the deflecting member 54 and to prevent the deflecting member 54 from being deformed due to external or internal forces, in particular due to rotation of the body 51.

Although the invention is illustrated above, partly with reference to some specific embodiments, it must be understood that numerous modifications and combinations of different features of the embodiments can be made and that the different features can be combined with each other or with laser scanners known from prior art.

What is claimed is:

1. A surveying device comprising:
a base which defines a base axis;
a support structure which is arranged to be rotatable around the base axis and which defines a rotation axis which is oriented basically orthogonal relative to the base axis;
a light emitting unit for emitting measuring light;
a light receiving unit comprising a detector for detecting reflected measuring light;
a rotation unit mounted on the support structure for providing emission and reception of measuring light in defined directions, wherein the rotation unit comprises a rotation body which is mounted rotatable around the rotation axis and wherein the rotation body comprises at least one slanted scanning surface which comprises a scanning mirror which is arranged tilted relative to the rotation axis and provides defined deflection of the measuring light;
an imaging unit for capturing an image of a scanning region; and
a controlling and processing unit,
wherein:
the imaging unit comprises at least one camera which is fixedly arranged with the support structure, the camera defining a particular optical axis,
the rotation body comprises at least one deflecting surface different from the scanning surface,
the at least one camera is assigned to the at least one deflecting surface,
the imaging unit and the rotation body are configured and arranged relative to each other so that only in a predetermined range of alignment of the rotation body around the rotation axis:
the optical axis of the at least one camera is deflected by its assigned deflecting surface, and
a field of view of the at least one camera is deflected and defined by the deflection of the optical axis so that the field of view comprises a defined field angle around the rotation axis,
wherein the rotation body is configured so that a reflecting surface of the scanning mirror faces in opposite direction of at least one of the deflecting surfaces, or
the rotation body is configured so that the scanning mirror is arranged on a front side of the rotation body and the deflecting surfaces are arranged on the backside of the rotation body, or
the rotation body is arranged in a cylindrical cover which is designed to provide at least a first transmission window for emission and reception of the measuring light and a second transmission window for reception of light for capturing images by the at least one camera.

2. The surveying device according to claim 1, wherein:
the imaging unit comprises at least two cameras which are fixedly arranged on the support structure, each camera of the at least two cameras defining a particular optical axis,
the rotation body comprises at least two adjacent deflecting surfaces,
the at least two deflecting surfaces are arranged tilted relative to each other,
each of the at least two cameras is assigned to one particular of the at least two deflecting surfaces, and
the imaging unit and the rotation body are configured and arranged relative to each other so that in the predetermined range of alignment of the rotation body around the rotation axis a combined and continued wide-angle field of view around the rotation axis is provided.

3. The surveying device according to claim 1, wherein the imaging unit comprises three or more cameras and the rotation body comprises three or more deflecting surfaces, wherein each camera is assigned to one of the deflecting surfaces, and a combined and continued wide-angle field of view with reference to the rotation axis is provided.

4. The surveying device according to claim 2, the at least two deflecting surfaces are arranged with a gap formed between two successively arranged adjacent deflecting surfaces.

5. The surveying device according to claim 2, wherein the continued wide-angle field of view covers an angle of at least 100° around the rotation axis (B).

6. The surveying device according to claim 2, wherein each of the fields of view which is defined by a deflection by means of the assigned deflecting surface in the predetermined alignment range partly covers the wide-angle field of view, wherein an overlap of adjacent fields of view is provided.

7. The surveying device according to claim 1, wherein:
the imaging unit comprises at least two sets of cameras, wherein each set comprises a quantity of at least one camera,
the rotation body comprises a defined quantity of deflecting surfaces corresponding to the quantity of cameras, and
the predetermined range of alignment of the rotation body around the rotation axis comprises a number of at least two defined imaging alignments, the number corresponding to the number of sets of cameras,
each deflecting surface is assigned to one camera of each set of cameras,
the imaging unit and the rotation body are configured and arranged relative to each other so that in a first of the at least two defined imaging alignments:
the optical axis of the one camera of the first set of cameras is deflected by the assigned deflecting surface, and
a field of view of the one camera of the first set of cameras is deflected and defined by the assigned deflecting surface so that the field of view comprises a defined field angle around the rotation axis, and
the imaging unit and the rotation body are designed so and arranged relative to each other so that in a second of the at least two defined imaging alignments:
the optical axis of the one camera of the second set of cameras is deflected by the assigned deflecting surface, and
a field of view of the one camera of the second set of cameras is deflected and defined by the assigned deflecting surface so that the field of view comprises a defined field angle around the rotation axis.

8. The surveying device according to claim 1, wherein:
the controlling and processing unit provides an imaging functionality which is configured so that image data is recordable with each of the at least one cameras in case the rotation body is in the predetermined range of alignment, and
the controlling and processing unit is configured to control a step of rotating the rotation body around the rotation axis so that the rotation body is brought in the predetermined range of alignment.

9. The surveying device according to claim 1, wherein the imaging unit and the rotation body are configured and arranged relative to each other so that in the predetermined range of alignment of the rotation body, an optical distance from one of the deflecting surfaces to a respective entrance pupil of the respectively assigned camera along the optical axis of this camera corresponds to an optical distance from an intersection point of the optical axis with the deflecting surfaces to a nodal point of the surveying device.

10. The surveying device according to claim 1, wherein at least one of the at least one deflecting surfaces is provided by a reflecting mirror, wherein the reflecting mirror:
is provided by one planar surface of the rotation body, wherein the planar surface is formed as one part with the rotation body, or
is provided as a separate mirror element attached to the rotation body.

11. The surveying device according to claim 1, wherein at least one of the at least one deflecting surfaces is a coated mirror surface of a prismatic element, wherein the prismatic element is attached to the rotation body.

12. The surveying device according to claim 11, wherein the prismatic element is formed out of material having:
a density basically corresponding to a density of a material of the rotation body, or
a refractive index n significant greater than the refractive index n of air or vacuum.

13. The surveying device according to claim 1, the predetermined range of alignment is provided by only one particular rotation region around the rotation axis.

14. The rotation body of a rotation unit for a surveying device, the rotation body being adapted to be mounted on the surveying device for providing defined emission and reception of measuring light by rotation around a rotation axis, the rotation axis being defined by a shape and dimension of the rotation body, wherein the rotation body comprises:
at least one slanted scanning surface which comprises a scanning mirror which is arranged tilted relative to the rotation axis and provides defined deflection of the measuring light,
wherein:
the rotation body comprises at least two deflecting surfaces each of which provides defined deflection of an optical axis of an assigned camera, the deflecting surfaces differing from the scanning surface, and
the at least two deflecting surfaces are arranged relative to each other so that each of the deflecting surfaces lies on a different lateral face of a virtual pyramid defined thereby.

* * * * *